Figure 1:
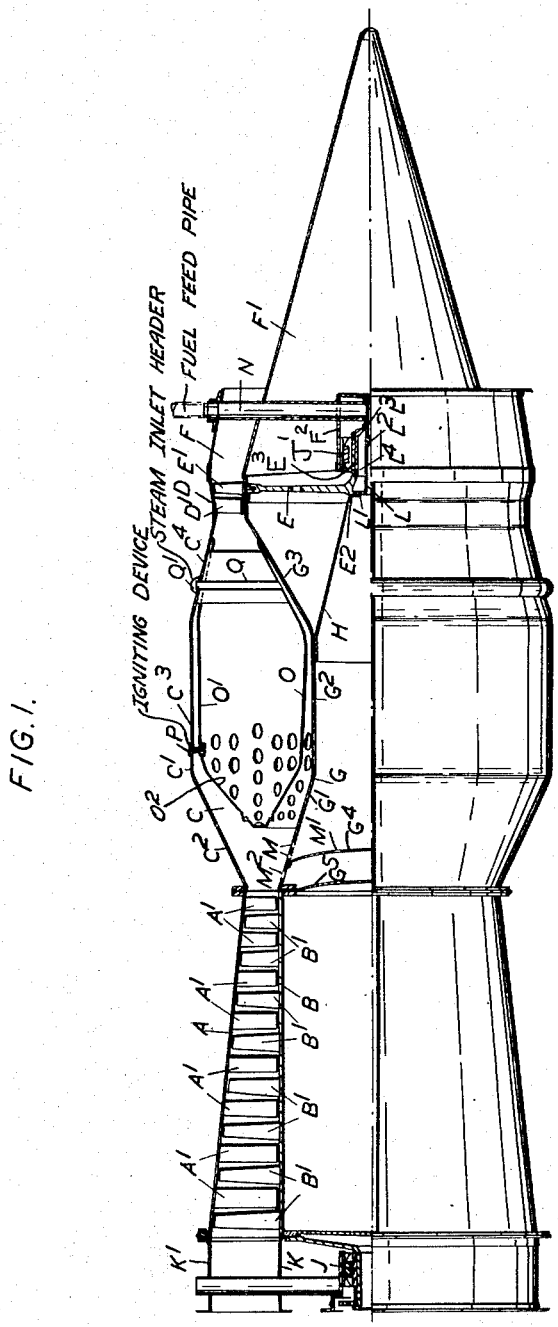

May 28, 1957  A. R. MORTIMER  2,793,496
COMBUSTION TURBINE UNITS

Filed June 3, 1952

2 Sheets-Sheet 1

Inventor
Alfred R Mortimer
By Watson, Cole, Grindle &
Watson
Attorneys

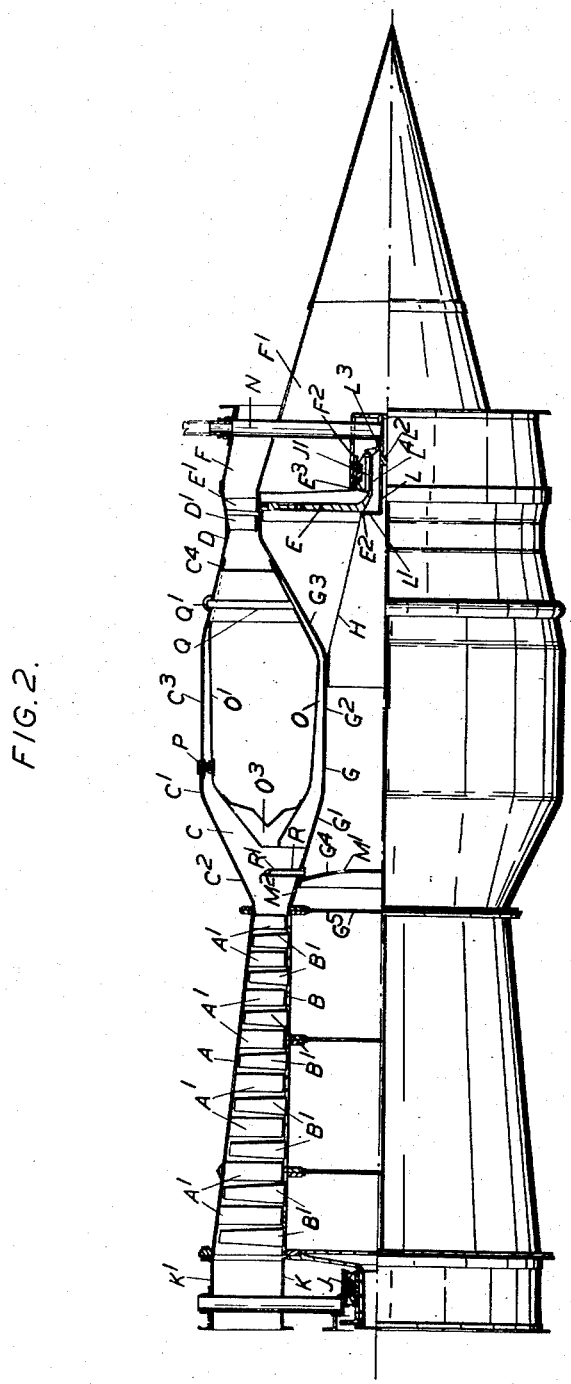

United States Patent Office 2,793,496
Patented May 28, 1957

2,793,496
COMBUSTION TURBINE UNITS

Alfred Robert Mortimer, Ickenham, England, assignor to D. Napier & Son Limited, London, England, a British company Application June 3, 1952, Serial No. 291,442

Claims priority, application Great Britain June 4, 1951

5 Claims. (Cl. 60—39.35)

This invention relates to combustion turbine units of the kind comprising an air compressor, an annular combustion chamber and a turbine arranged with the rotors of the compressor and the turbine directly connected to one another and coaxial with one another and with the annular combustion chamber, the compressor delivering air to the adjacent end of the annular combustion chamber (hereinafter for convenience called the front end) while the products of combustion leaving the opposite or rear end of the combustion chamber act on the rotor of the turbine.

The invention is particularly but not exclusively applicable to such units as used for jet propulsion purposes wherein the propulsive effect is produced by ejecting the hot gases after passing through the turbine through a propulsion nozzle, and one of the objects of the invention is to provide such a unit which, while being effective in operation, will be of a simple character and have a comparatively small number of separate parts or elements, so as to be suitable, for example for an expendable unit, that is to say a unit which is required to have only a limited working life of, say, half an hour or so as used for pilotless missiles.

In a combustion turbine unit of the kind referred to according to the present invention the inner wall of the annular combustion chamber is mounted to rotate as a unit with the rotary assembly comprising the rotors of the compressor and turbine, means are provided for feeding fuel to the interior of the rotatable inner wall of the combustion chamber at a point in its length displaced by a substantial distance from the front end thereof, and delivery orifices or nozzles are provided in the rotary inner wall of the combustion chamber at positions adjacent to the front end thereof so that the fuel will be ejected through such apertures or nozzles by centrifugal force into the combustion chamber after travelling along an appreciable length of the interior of the rotary inner wall of the combustion chamber from the point at which the fuel enters the interior of such wall to the delivery orifices or nozzles.

Preferably, in addition to the delivery orifices or nozzles through which liquid fuel is thus ejected into the combustion chamber, which orifices or nozzles open into the interior of the rotary inner wall at points substantially on the circumference thereof, additional orifices (hereinafter for convenience called vaporized fuel orifices) are provided opening into the interior of the rotary inner wall at points displaced inwards from the circumference of such wall and arranged so that fuel vaporized during its passage along the interior of such inner wall can pass therethrough into the combustion chamber.

Thus in one convenient arrangement the rotary inner wall of the combustion chamber is provided with an inwardly extending flange or end wall near its forward end and the vaporised fuel orifices pass through such flange or end wall into a space having a circumferential wall constituting the extreme front end of the rotary inner combustion chamber wall and itself having orifices through which the vaporized fuel passes from such space into the combustion chamber.

The invention may take various constructional forms but two constructions according to the invention as applied to combustion turbine units for propulsion purposes are shown by way of example somewhat diagrammatically in the accompanying drawings, in which Figure 1 is a sectional side elevation of one construction according to the invention, and Figure 2 is a sectional side elevation of a modified construction according to the invention.

In the construction shown in Figure 1 the combustion turbine unit comprises a multi-stage axial flow air compressor having a stator casing A carrying the usual stationary blade rings $A^1$ and a tubular rotor B carrying the rotor blade rings $B^1$, an annular combustion chamber generally indicated by the reference letter C, and a turbine comprising an outer casing D carrying a nozzle blade ring $D^1$ and a rotor E in the form of a disc carrying the rotor blade ring $E^1$.

Rigidly secured to the outer casing D of the turbine is an annular outlet passage F for the gases, by which they are delivered to a propulsion nozzle of suitable form formed between an outer wall (not shown) and a tapered inner member $F^1$.

The annular combustion chamber C comprises a stationary outer circumferential wall $C^1$ rigidly connected at its front and rear ends respectively to the stator casing A of the compressor and to the outer casing D of the turbine, and a rotary inner circumferential wall G rigidly connected at its front and rear ends respectively to the tubular rotor B of the compressor and to the rotor disc E of the turbine.

As will be seen the rotary inner wall of the combustion chamber includes a frusto-conical forward part $G^1$, a cylindrical intermediate part $G^2$ and a frusto-conical rear part $G^3$, while the stationary outer circumferential wall of the combustion chamber comprises a frusto-conical forward part $C^2$, a cylindrical intermediate part $C^3$ and a frusto-conical rear part $C^4$ so that the two circumferential walls C and G give to the combustion chamber as a whole the appropriate cross section in planes containing the axis of the unit as a whole.

It will be apparent that the inner circumferential wall G serves to transmit the required torque between the rotors E and B respectively of the turbine and compressor. It will also be seen that a frusto-conical member H is arranged within the inner circumferential wall G so as to extend between a spigot $E^2$ on the rotor disc E and the cylindrical part $G^2$ of the wall G.

The rotary assembly comprising the rotor B, the inner combustion chamber wall G and the rotor E is supported in bearings J and $J^1$ at its ends carried respectively by the inner wall K of an annular air intake member $K^1$ secured to the front end of the casing A of the compressor and by a hollow boss member $F^2$ rigid with the annular outlet passage F.

Extending across the interior of the rotary inner wall G of the combustion chamber are two spaced walls $G^4$, $G^5$.

Rigid with the hollow boss member $F^2$ is a tubular fuel feed member L which extends within the hollow hub $E^3$ of the rotor disc E and is provided at its forward end with a flange $L^1$ lying close to but spaced by a small annular gap from the inner surface of the spigot $E^2$ while formed in the inner circumferential wall G of the combustion chamber adjacent to its front end are two annular rows of fuel delivery orifices M. The tubular feed member L has an internal partition $L^2$ and a series of radial fuel openings $L^3$ so that fuel fed to the interior of the member L is delivered into an annular chamber $L^4$ between it and the inner surface of the hollow hub $E^3$. In addition, vaporized fuel orifices $M^1$ are formed in the wall $G^4$ at points radially displaced inwards from the circumferential wall G while further vaporized fuel orifices $M^2$ are formed in the circumferential wall G at a point between the walls $G^4$ and $G^5$.

Means including a feed pipe N are provided for feeding fuel to the unit.

Supported within the combustion chamber C is a heat insulating casing or flame tube comprising inner and outer circumferential walls O, $O^1$ supported from the outer circumferential wall $C^1$ of the combustion chamber, the inner and outer walls of the flame tube being connected at their forward ends by a part $O^2$ provided with openings or perforations by which the interior of the flame tube communicates with the forward end of the combustion chamber C, while the rear end of the flame tube opens freely into the rear end of the combusion chamber. Arranged within the outer wall of the combustion chamber and extending into the casing O, $O^1$ is an igniting device indicated at P while, in addition, a series of perforated tubes Q may extend across the interior of the casing O, $O^1$ from a header $Q^1$ on the outer wall $C^1$ of the combustion chamber for the admission of steam.

In operation fuel is admitted through the feed pipe N and passes into the member L, and through the fuel openings $L^3$ into the chamber $L^4$, whence it passes through the annular gap between the flange $L^1$ and the spigot $E^2$ into the interior of the frusto-conical member H. Under the influence of centrifugal force, the fuel then passes along the interior of the member H and then along the interior of the parts $G^2$ and $G^1$ of the inner circumferential wall of the combustion chamber C until it reaches the fuel delivery orifices M through which it will then be delivered by centrifugal force into the combustion chamber C. It will, moreover, be seen that, during its passage along the interior of the inner circumferential wall G of the combustion chamber the fuel will tend to be heated and that any fuel which may thus be vaporized can pass through the vaporized fuel orifices $M^1$ into the chamber between the two walls $G^4$ and $G^5$ and thence through the further vaporized fuel orifices $M^2$ into the combustion chamber C. The fuel will, moreover, while being itself heated tend to cool the inner circumferential wall G of the combustion chamber. It will be understood that the fuel delivered through the orifices M may be partly liquid and partly gaseous depending on conditions, while fuel passing through the orifices $M^1$, $M^2$ will be wholly gaseous.

In the modified construction shown in Figure 2 the construction and arrangement of the parts of the combustion turbine unit are generally the same as in the construction shown in Figure 1 and similar parts have been given similar reference letters and will not be again described.

The only features in which the construction shown in Figure 2 differs from that shown in Figure 1, apart from minor constructional details, are that in the construction shown in Figure 2, instead of the fuel delivery orifices M a series of radially extending tubular fuel delivery nozzles R is provided, each nozzle R extending radially a substantial distance into the combustion chamber C, while in addition the forward end of the flame tube O, $O^1$ is formed as shown at $O^3$ to provide an annular opening lying adjacent to but slightly in rear of the outer ends of the nozzles R. Each of the nozzles R is provided in its outer end with a series of fuel delivery orifices $R^1$ arranged so that the fuel delivered therethrough will tend to be swept by the air from the compressor directly into the opening $O^3$. The nozzles R may be arranged so that the fuel is delivered thereby in any suitable direction or directions with a view to obtaining the most satisfactory distribution of fuel in the air delivered by the compressor.

What I claim as my invention and desire to secure by Letters Patent is:

1. A combustion turbine unit including in combination an air compressor including a stator and rotor, a turbine including a stator and rotor with the turbine and compressor rotors disposed coaxially, an annular combustion chamber extending between the outlet end of the compressor and the inlet end of the turbine coaxially with the turbine and compressor rotors and including an outer circumferential wall rigid with the stators of the turbine and compressor and a rotary inner circumferential wall rigid with the rotors of the turbine and compressor to form therewith a rotor assembly, and means for feeding fuel to the interior surface of the said rotary inner circumferential wall and into heat exchanging relation with such surface at a point displaced by a substantial distance from that end of the wall which lies nearer the compressor, the said rotary inner circumferential wall being provided at positions therein adjacent to the end lying nearer to the compressor with fuel delivery orifices for the delivery of the fuel into the combustion chamber, whereby the fuel is caused to travel along the interior surface of said rotary inner circumferential wall from the point at which the fuel is fed to the interior surface of said wall to the fuel delivery orifices, and to absorb heat from said interior surface, the said rotor assembly including vaporized fuel delivery orifices communicating with the interior of the rotary inner combustion chamber wall at positions displaced radially inwards from the circumference of said rotary inner combustion chamber wall, and with the combustion chamber, the said rotor assembly including an inwardly extending wall near the end of the rotary inner circumferential wall of the combustion chamber which lies nearer the compressor to limit the travel of liquid fuel along the inner surface of said rotary inner circumferential wall, and the fuel delivery orifices being formed in the rotary inner circumferential wall on the side of said inwardly extending wall remote from the compressor and the said vaporized fuel delivery orifices being formed in said inwardly extending wall.

2. A combustion turbine unit as claimed in claim 1 including a heat insulating shell or flame tube within the combustion chamber and comprising inner and outer circumferential walls spaced respectively from the inner and outer walls of the combustion chamber, and means for supporting the said flame tube from the outer circumferential wall of the combustion chamber.

3. A combustion turbine unit as claimed in claim 2 in which at least some of the fuel delivery orifices communicate with fuel delivery nozzles each of which extends radially into the combustion chamber and has at least one delivery orifice adjacent to its outer end disposed so that the fuel therefrom tends to enter the adjacent end of the flame tube.

4. A combustion turbine including in combination a multi-stage axial flow compressor including a stator casing and a rotor, a turbine comprising a stator and rotor with the rotors of the compressor and turbine coaxial, an annular combustion chamber disposed between the compressor and turbine and coaxial with the rotors thereof and including a stationary outer circumferential wall rigidly connected at its ends respectively to the stators of the compressor and turbine and an inner circumferential wall rigidly connected at its ends respectively to the rotors of the compressor and turbine so as to form therewith a unitary rotor assembly, bearings rigidly supported respectively from the inlet end of the compressor stator and from the turbine stator and carrying the ends of the said rotor assembly, means for delivering fuel to the end of the interior of the rotary inner circumferential wall of the combustion chamber adjacent to the turbine, and spaced internal partitions adjacent to the end of the rotary inner circumferential wall of the combustion chamber adjacent to the compressor, fuel delivery openings being formed in the rotary inner circumferential wall of the combustion chamber at points adjacent to but on the side of both said partitions which lies remote from the compressor, delivery orifices for vaporized fuel formed in the one of said partitions which lies more remote from the compressor and at points radially displaced inwards from the rotary inner circumferential wall of the combustion chamber, and further vaporized fuel delivery orifices formed in the part of the rotary inner circumferential wall of the combustion chamber which lies between said partitions.

5. A combustion turbine as claimed in claim 4 including a flame tube within the annular combustion chamber comprising inner and outer circumferential walls spaced respectively from the inner and outer circumferential walls of the combustion chamber and having an annular opening between them at their ends adjacent to the compressor, means for supporting the flame tube from the outer circumferential wall of the combustion chamber, and fuel delivery nozzles extending from the fuel delivery orifices in the inner circumferential wall of the combustion chamber and provided with delivery orifices lying adjacent to the said annular opening.

References Cited in the file of this patent
UNITED STATES PATENTS

| | | |
|---|---|---|
| 1,418,444 | Josephs | June 6, 1922 |
| 2,404,767 | Heppner | July 23, 1946 |
| 2,479,776 | Price | Aug. 23, 1949 |
| 2,610,467 | Miller | Sept. 16, 1952 |